(12) United States Patent
Zhou et al.

(10) Patent No.: US 12,241,790 B2
(45) Date of Patent: Mar. 4, 2025

(54) VISUAL MONITORING METHOD FOR CROSS-SECTION TEMPERATURE FIELDS AND RADIATION CHARACTERISTICS OF BOILER FURNACES BY COMBINING RADIATION IMAGES AND SPECTRA

(71) Applicant: China University of Mining and Technology, Jiangsu (CN)

(72) Inventors: Huaichun Zhou, Jiangsu (CN); Kuangyu Li, Jiangsu (CN); Bo Yu, Jiangsu (CN); Xianyong Peng, Jiangsu (CN); Han Guo, Jiangsu (CN); Kun Yang, Jiangsu (CN); Zhuoran Jing, Jiangsu (CN)

(73) Assignee: China University of Mining and Technology, Jiangsu (CN)

( * ) Notice: Subject to any disclaimer, the term of this patent is extended or adjusted under 35 U.S.C. 154(b) by 0 days.

(21) Appl. No.: 18/036,396

(22) PCT Filed: Nov. 17, 2022

(86) PCT No.: PCT/CN2022/132469
§ 371 (c)(1),
(2) Date: May 10, 2023

(87) PCT Pub. No.: WO2024/098447
PCT Pub. Date: May 16, 2024

(65) Prior Publication Data
US 2024/0337538 A1    Oct. 10, 2024

(30) Foreign Application Priority Data
Nov. 15, 2022  (CN) .......................... 202211422723.1

(51) Int. Cl.
*G01J 5/07*    (2022.01)
*G01J 5/00*    (2022.01)
(Continued)

(52) U.S. Cl.
CPC ............. *G01J 5/485* (2022.01); *G01J 5/0044* (2013.01); *G01J 5/0802* (2022.01);
(Continued)

(58) Field of Classification Search
CPC ............. G01J 5/0044; G01J 2005/0074; G01J 2005/0077; G01J 5/07; G01J 5/08;
(Continued)

(56) References Cited

U.S. PATENT DOCUMENTS 4,411,519 A * 10/1983 Tagami ..................... G01J 5/60
356/406
5,355,845 A * 10/1994 Burgess .................. G01J 5/601
122/504
(Continued)

FOREIGN PATENT DOCUMENTS

CN    111458051    7/2020
CN    111751008    10/2020
(Continued)

OTHER PUBLICATIONS

Huaichun Zhou et al., "Research progress on monitoring three-dimensional temperature distributions in coal-fired boilers and industrial furnaces", Clean Coal Technology, Oct. 31, 2022, pp. 1-14, vol. 28, No. 10.
(Continued)

*Primary Examiner* — Allen C. Ho
(74) *Attorney, Agent, or Firm* — JCIPRNET

(57) ABSTRACT

Disclosed in the present invention is a visual monitoring method for cross-section temperature fields and radiation characteristics of boiler furnaces by combining radiation images and spectra. Image detectors can be directly inserted into observation holes of a boiler to acquire flame image data, so that when the detection system is applied to a power station boiler, extra holes are not required to be drilled, and
(Continued)

therefore, there is no risk that the strength of a furnace wall of the boiler is reduced by drilling holes. According to cross-section temperature fields of a furnace measured by the detection system, the state of combustion in the furnace can be accurately judged, which can play an accurate and effective guiding role in boiler combustion control, and reduce the temperature deviation in each combustion area of the boiler so as to keep the boiler running smoothly, thereby improving the combustion efficiency of the boiler.

5 Claims, 7 Drawing Sheets

(51) Int. Cl.
    G01J 5/08    (2022.01)
    G01J 5/0802  (2022.01)
    G01J 5/10    (2006.01)
    G01J 5/48    (2022.01)
    G01J 5/60    (2006.01)
    G01J 5/80    (2022.01)

(52) U.S. Cl.
    CPC ............... G01J 5/0887 (2013.01); G01J 5/10 (2013.01); G01J 5/602 (2013.01); G01J 5/802 (2022.01); G01J 5/804 (2022.01); *G01J 2005/0074* (2013.01); *G01J 2005/0077* (2013.01); *G01J 2005/604* (2013.01); *G01J 2005/607* (2013.01)

(58) Field of Classification Search
    CPC ...... G01J 5/0801; G01J 5/0802; G01J 5/0887; G01J 5/10; G01J 5/485; G01J 5/60; G01J 5/601; G01J 5/602; G01J 2005/604; G01J 2005/607; G01J 5/80; G01J 5/802; G01J 5/804

USPC ................................ 374/120, 121, 123, 124
See application file for complete search history.

(56) References Cited

U.S. PATENT DOCUMENTS

| | | | | |
|---|---|---|---|---|
| 7,604,360 | B2 * | 10/2009 | Chen | G01J 5/602 |
| | | | | 348/371 |
| 7,938,576 | B1 * | 5/2011 | Kychakoff | G01J 5/605 |
| | | | | 374/124 |
| 9,196,032 | B1 * | 11/2015 | Kraus | G06T 15/08 |
| 10,043,288 | B2 * | 8/2018 | Kraus | G06T 17/00 |
| 10,060,725 | B2 * | 8/2018 | Bonin | G01J 5/602 |
| 10,274,375 | B2 * | 4/2019 | Dubbs | G01J 5/03 |
| 11,248,963 | B2 * | 2/2022 | Kraus | G01J 5/0014 |
| 11,359,967 | B2 * | 6/2022 | Cao | G01J 5/00 |

FOREIGN PATENT DOCUMENTS

| | | |
|---|---|---|
| CN | 113294771 | 8/2021 |
| WO | 2014067549 | 5/2014 |

OTHER PUBLICATIONS

Chun Lou et al., "Experimental Investigation on Simultaneous Reconstruction of Cross-Section Temperature Distribution and Radiation Properties in a Boiler Furnace", Proceedings of the CSEE, Jul. 31, 2006, pp. 98-103, vol. 26, No. 14.

"International Search Report (Form PCT/ISA/210) of PCT/CN2022/132469", mailed on Feb. 22, 2023, pp. 1-4.

* cited by examiner

VISUAL MONITORING METHOD FOR CROSS-SECTION TEMPERATURE FIELDS AND RADIATION CHARACTERISTICS OF BOILER FURNACES BY COMBINING RADIATION IMAGES AND SPECTRA

CROSS-REFERENCE TO RELATED APPLICATION

This application is a 371 of international application of PCT application serial no. PCT/CN2022/132469, filed on Nov. 17, 2022, which claims the priority benefits of China application no. 202211422723.1, filed on Nov. 15, 2022. The entirety of each of the above-mentioned patent applications is hereby incorporated by reference herein and made a part of this specification.

TECHNICAL FIELD

The present invention belongs to the field of thermal radiation temperature detection, and relates to a visual monitoring method for cross-section temperature fields and radiation characteristics of boiler furnaces by combining radiation images and spectra.

BACKGROUND

In recent years, in order to achieve the goals of peak carbon dioxide emissions and carbon neutrality, the proportion of electricity generated from new energy in the power grid has increased significantly, which brings a great peak regulation pressure to the power grid. Traditional coal-fired power generation can escort the stable operation of a power system by participating in deep peak regulation, which, however, requires a unit to have a capacity of stable operation under fast variable loads and low loads. When a pulverized coal boiler in a power plant operates under operating conditions of fast variable loads and low loads, it is necessary to adjust the operating conditions of the boiler in time. The furnace temperature distribution of a boiler is an important parameter to reflect the combustion state of the boiler, and thus, combustion control can be performed effectively only by accurately measuring the furnace temperature distribution.

At present, there are two kinds of visual monitoring technologies for temperature fields which can be applied to large furnaces, i.e., an acoustic method and an optical method, where the optical method can be subdivided into a laser spectroscopy and a radiation spectroscopy according to that whether an external light source is needed. In a temperature measurement technology using the acoustic method, a temperature distribution is solved based on speed and frequency changes of acoustic waves in the process of propagation, and in a temperature measurement technology using the laser spectroscopy, a temperature distribution of gas is calculated based on the changes of laser before and after passing through the gas. In both the acoustic method and the laser spectroscopy, pairs of acoustic/laser transmitters and receivers are required when a temperature field in a furnace is detected, and thus, the system is high in complexity, the resolution of temperature field detection is limited by the number of temperature measurement paths, and the cost is high.

The radiation spectroscopy as one of furnace cross-section temperature field detection methods is implemented by acquiring low-dimensional self-radiation signals of a combustion flame in a furnace by using cameras disposed at different angles, establishing a radiation imaging equation between the low-dimensional signals received by the cameras and a high temperature distribution inside the furnace according to a radiation transfer equation, and then obtaining a furnace temperature distribution by solving inverse problems of radiative transfer. A signal receiving terminal of a three-dimensional temperature field detection system in the furnace based on the radiation spectroscopy is usually an industrial camera, and no transmitting terminal is required, so compared with the acoustic method and the laser spectroscopy, the radiation spectroscopy has the advantages of compact system, fast response, high spatial and temporal resolution, and the like, and therefore, the radiation spectroscopy is more applicable to the online monitoring of a temperature field in a furnace of a boiler.

At present, data sources for detecting a temperature distribution in a furnace based on the radiation spectroscopy are flame radiation images acquired by cameras. However, the flame radiation images acquired by industrial cameras can only reflect radiation energy in different wave bands through R, G and B channels, and thus, the spectral resolution is low, which may cause a large deviation in the overall level of the calculated temperature distribution. In addition, in the prior art, when the temperature distribution is reconstructed, it is usually assumed that the radiation characteristics of mediums in a furnace are uniformly distributed, which reduces the difficulty of solving the radiation transfer equation, but sacrifices the accuracy of reconstruction results. "A method for detecting a three-dimensional temperature field distribution in a furnace of a boiler based on color flame image processing" applied by the applicant on Jun. 29, 2020 has been awarded a national patent (patent No.: CN111751008A), in which it is proposed that the radiation characteristics of mediums in the furnace are assumed to be second-order polynomials in space coordinates, so that the accuracy of temperature distribution detection is improved, however, the method requires higher computer performance, and the implementation of the method in a boiler site is more complicated.

SUMMARY

A problem to be solved by the present invention is: to overcome the deficiencies in the prior art, a visual monitoring method for cross-section temperature fields and radiation characteristics of boiler furnaces by combining radiation images and spectra is provided, which takes into account accuracy, timeliness and portability. Flame radiation images and spectra in a furnace are synchronously acquired respectively by cameras and a spectrometer, a flame image temperature is corrected by using an emissivity ratio obtained by analysis on the flame radiation spectra, and according to the proposed reconstruction algorithm based on a radiation intensity imaging model, a temperature distribution and an absorption coefficient distribution in the furnace are reconstructed simultaneously.

Further, a dual-narrow-band pass color filter is installed in front of the image detector, two central wavelengths $\lambda_G$ and $\lambda_R$ of the dual-narrow-band pass color filter correspond to peaks of spectral response curves of G and R channels of an industrial camera respectively, a half-band width is less than 20 nm, and the emissivity ratio is a ratio $\varepsilon_{\lambda_G}/\varepsilon_{\lambda_R}$ of emissivities of a flame at wavelengths of $\lambda_G$ and $\lambda_R$.

Further, the reconstruction algorithm based on the radiation intensity imaging model includes the following steps:

1) meshing a cross-section of a furnace: dividing the cross-section of the furnace into m space medium units and n wall units; and
2) constructing the radiation intensity imaging model:
3) reconstructing a monochromatic blackbody radiation intensity distribution by using a regularization algorithm, and in the process of calculation, introducing the emissivity ratio obtained by spectrum analysis to correct a cross-section temperature field reconstruction matrix;
4) updating an absorption coefficient and a scattering coefficient by using a Newton iteration algorithm, and calculating a temperature distribution when a residual is extremely small; and
5) calculating an absorption coefficient distribution by taking the scattering coefficient as a known parameter.

Further, the radiation intensity imaging model is as follows:

a flame monochromatic radiation intensity received by each pixel unit of the image detector is expressed by Equation (1):

$$I_\lambda(O, s) = \int_0^{l_w} \left[\frac{1}{\pi} e^{-\int_l \beta(l')dl'} \kappa_\lambda(l)n^2\right] I_{b\lambda}(T, v) dl + \qquad (1)$$

$$\int_S \left[\int_0^{l_w} \frac{1}{\pi} e^{-\int_l \beta(l')dl'} \kappa_\lambda(v)n^2 R_d^s(v, l, s) dl + \right.$$

$$\left. \frac{4}{\pi} e^{-\int_{l_w} \beta(l')dl'} \kappa_\lambda(v)n^2 R_d^s(v, w, s)\right] I_{b\lambda}(T, v) ds$$

where, l and l' represent paths of radiation transmission of the space medium units, $l_w$ represents a path of radiation transmission of the wall unit, and w represents the wall unit; v and v' represent the space medium units; s represents a whole space medium area; $\sigma$ is a Stefan-Boltzmann constant, $5.67\times10^{-8}$, W/(m$^2$·K$^4$); a parameter in the shape of Rd$^s$ (a, b, s) is called DRESOR number and represents a product of $4\pi$ and the share of energy emitted from a volume element centred on point a scattered by a unit volume centred on point b within a unit solid angle with s as a center line; k and n are a medium absorption coefficient and a refractive index; $\beta=\sigma+\kappa$ is an attenuation coefficient, and $\sigma$ is a medium scattering coefficient; $\varepsilon$ is a wall emissivity; and $I_{b\lambda}$ is a monochromatic blackbody radiation intensity, W/m$^3$·sr;

according to the Planck's Blackbody radiation law:

$$I_{b\lambda}(T) = \frac{1}{\pi}\frac{C_1}{\lambda^5}\exp\left(-\frac{C_2}{\lambda T}\right) \qquad (2)$$

Equation (1) is discretized to obtain:

$$I_\lambda(i) = \sum_{j=1}^m R_{d,g I_\lambda}(j \to i) 4\kappa_j \frac{1}{\pi}\frac{C_1}{\lambda^5}\exp\left(-\frac{C_2}{\lambda T_{g,j}}\right)\Delta S_{g,j} \qquad (3)$$

$$= \sum_{j=1}^m A_{I_\lambda}(i, j) I_{b\lambda}(j), i = 1, \ldots, p$$

where, $R_{d,g I}(j\to i)$ represents the share of radiation from each unit in the furnace to each pixel unit of the image detector; $T_{g,j}$ is the temperature of the space medium unit; $\Delta S_{g,j}$ is a space medium area element; and $A_{I_\lambda}(i,j) = R_{d,g I_\lambda}(j\to i) 4\kappa_j$ is a radiation intensity imaging coefficient; and For a R channel of the image detector, Equation (3) is matrixed to obtain:

$$I_{\lambda_R} = A_{I_{\lambda_R}}(\kappa_{\lambda_R}, \sigma_{\lambda_R}) I_{b\lambda_R}(T). \qquad (4)$$

Further, in step 3, in the process of calculation, it is first assumed that the absorption coefficient and the scattering coefficient $\kappa_{\lambda_R}$ and $\sigma_{\lambda_R}$ of the R channel at the corresponding wavelength $\lambda_R$ are uniformly distributed, so that a coefficient matrix $$A_{I_{\lambda_R}}$$

is a known parameter, and a monochromatic blackbody radiation intensity distribution $I_{b\lambda_R}(T)$ is calculated by using the regularization algorithm; and one $I_{b\lambda_R}(T)$ is found to minimize the following Equation:

$$R(I_{\lambda_R}, \alpha) = \left\|I_{\lambda_R} - A_{I_{\lambda_R}}(\kappa_{\lambda_R}, \sigma_{\lambda_R}) I_{b\lambda_R}(T)\right\|^2 + \alpha\left\|D I_{b\lambda_R}(T)\right\|^2 \qquad (5)$$

where $\alpha$ is a regularization parameter, and D is a regularization matrix;

when Equation (5) is minimized, a solution of Equation (4) is:

$$I_{b\lambda_R}(T) = \left(A_{I_{\lambda_R}}^T(\kappa_{\lambda_R}, \sigma_{\lambda_R}) A_{I_{\lambda_R}}(\kappa_{\lambda_R}, \sigma_{\lambda_R}) + \alpha D^T D\right)^{-1} A_{I_{\lambda_R}}^T(\kappa_{\lambda_R}, \sigma_{\lambda_R}) I_{\lambda_R} \qquad (6)$$

$$= B_{I_{\lambda_R}}(\kappa_{\lambda_R}, \sigma_{\lambda_R}) I_{\lambda_R}$$

where $$B_{I_{\lambda_R}}$$

is a cross-section temperature field reconstruction matrix of the R channel;

For a G channel, the solution of Equation (4) can be written as:

$$I_{b\lambda_G}(T) = B_{I_{\lambda_G}}(\kappa_{\lambda_G}, \sigma_{\lambda_G}) I_{\lambda_G} \qquad (7)$$

$$= B_{I_{\lambda_R}}(\kappa_{\lambda_R}, \sigma_{\lambda_R}) \cdot \frac{\varepsilon_{\lambda_G}}{\varepsilon_{\lambda_R}} \cdot I_{\lambda_G}$$

where $$B_{I_{\lambda_G}}$$

is a cross-section temperature field reconstruction matrix of the G channel, and $\varepsilon_{\lambda_G}/\varepsilon_{\lambda_R}$ is an emissivity ratio obtained by spectrum analysis.

Further, the temperatures in Equations (6) and (7) can be calculated by the following Equation:

$$T = -\frac{C_2}{\lambda}/\ln\left(\frac{I_{b\lambda}\lambda^5}{C_1}\right); \qquad (8)$$

in the process of calculation, the absorption coefficient and the scattering coefficient $\kappa_{\lambda_R}$ and $\sigma_{\lambda_R}$ are updated by using the Newton iteration algorithm, temperature distributions reconstructed by the radiation intensities $I_{\lambda_R}$ and $I_{\lambda_G}$ acquired by the image detector in the R and G channels are calculated respectively, the two temperature distributions after being averaged are substituted into Equation (5) until the residual is minimized, so as to obtain a temperature field under an assumption of uniform $\kappa_{\lambda_R}$ and $\sigma_{\lambda_R}$.

Further, step 5) is based on Equation (9), $$I_\lambda = A'_{I_\lambda}(\sigma_\lambda)\kappa_\lambda I_{b\lambda}(T); \qquad (9)$$

where, $A'_{I_\lambda}$ is a new coefficient matrix that does not contain $\kappa$, and $\sigma_s$ is a known parameter;

$\kappa I_{b\lambda}(T)$ is calculated by using the regularization algorithm, and then the temperature distribution T calculated by Equation (8) is substituted into $\kappa I_{b\lambda}(T)$ so as to obtain a distribution of the absorption coefficient $\kappa$.

Further, there are four image detectors disposed at the observation holes on the same layer of the furnace, the image detectors are perpendicular to an external façade of the furnace and penetrates the inner side of a water-cooled wall, and the four image detectors communicate with a computer equipped with control software.

Further, the spectrometer is bundled together with any one of the image detectors, and communicates with the computer through a data line, and a collimating lens is disposed at the front end of an optical fiber of the spectrometer, and perpendicular to the external façade of the furnace.

Beneficial effects: in the prior art, when a temperature distribution is reconstructed, it is usually assumed that the radiation characteristics of mediums in a furnace are uniformly distributed, which reduces the difficulty of solving a radiation transfer equation, but sacrifices the accuracy of reconstruction results.

1. The present invention provides a visual monitoring method for cross-section temperature fields and radiation characteristics of boiler furnaces by combining radiation images and spectra, which takes into account accuracy, timeliness and portability.

2. According to the present invention, flame radiation images and spectra in the furnace are synchronously acquired respectively by cameras and a spectrometer, a flame image temperature is corrected by using an emissivity ratio obtained by analysis on the flame radiation spectra, and according to the proposed reconstruction algorithm based on a radiation intensity imaging model, a temperature distribution and an absorption coefficient distribution in the furnace are reconstructed simultaneously.

DETAILED DESCRIPTION OF THE INVENTION

The present invention will be further described below with reference to the accompanying drawing and embodiments:

1. Composition of an Image Detector

With a common color industrial camera as an example, a flame image detector is formed by arranging a dual-narrow-band pass color filter in front of a camera sensor in combination with a long lens rod. Two central wavelengths $\lambda_R$ and $\lambda_G$ of the dual-narrow-band pass color filter are located near peaks of spectral response curves of R and G channels of the industrial camera respectively, and a half bandwidth is less than 20 nm, so as to cooperate with the camera to obtain an approximate monochromatic flame image with a high signal-to-noise ratio.

2. Arrangement Forms of Image Detectors and a Spectrometer

Figure 1:
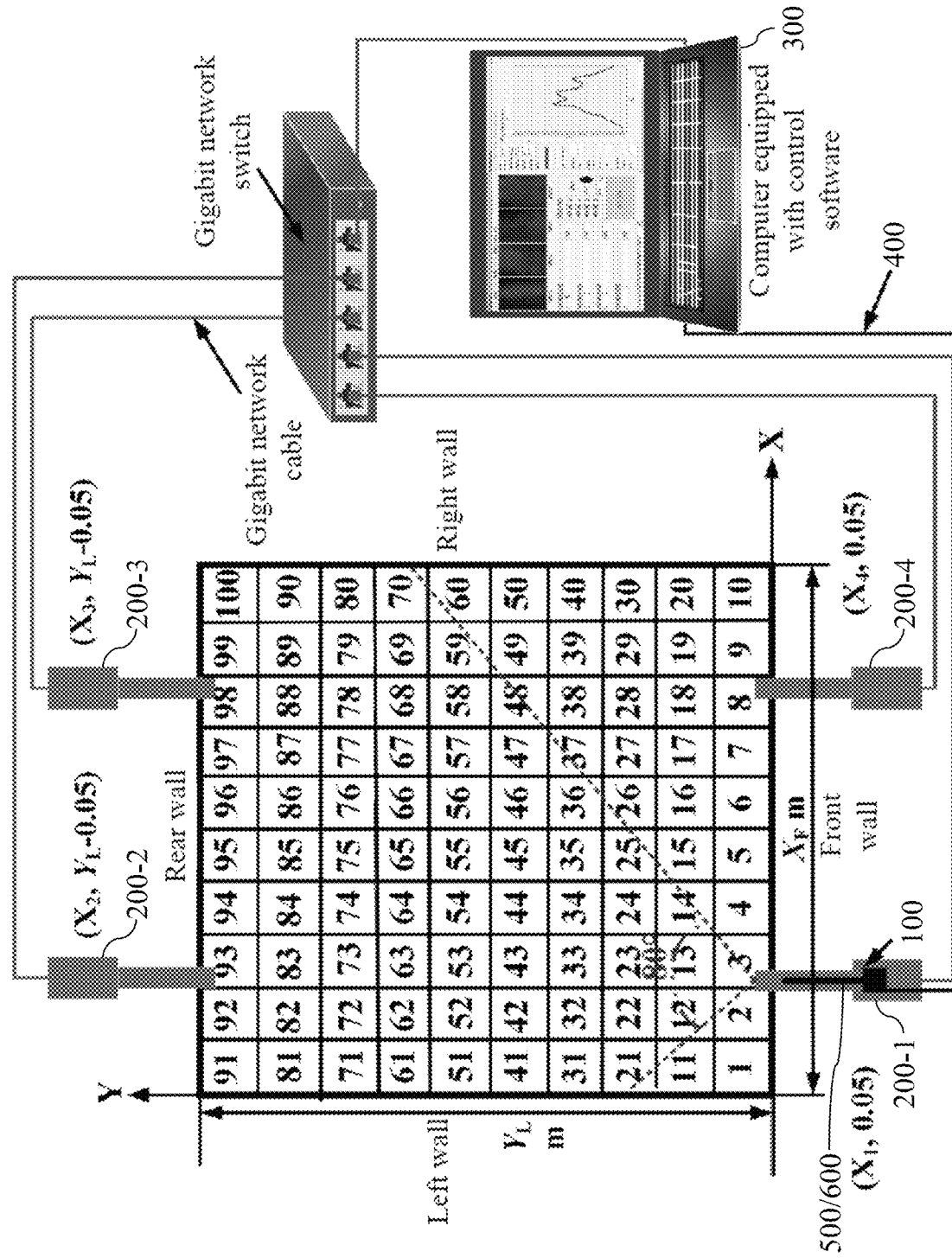
FIG. 1 is a schematic diagram of a visual monitoring system for cross-section temperature fields and radiation characteristics of boiler furnaces by combining radiation images and spectra.

As shown in FIG. 1, four image detectors 200-1, 200-2, 200-3 and 200-4 are arranged at observation holes on the same layer of a furnace, the image detectors 200-1, 200-2, 200-3 and 200-4 are perpendicular to an external facade of the furnace and penetrates a certain distance inside a water-cooled wall to obtain a better field of view. The four image detectors 200-1, 200-2, 200-3 and 200-4 are connected to a gigabit network switch via gigabit network cables, and then communicate with a computer 300 equipped with control software via the gigabit network switch. The fiber optic spectrometer 100 is bundled together with any one of the image detectors 200-1, 200-2, 200-3 and 200-4, and communicates with the computer 300 via a USB data line 400, and a collimating lens 500 is disposed at the front end of an optical fiber 600, and perpendicular to the external facade of the furnace.

3. Reconstruction of a Cross-Section Temperature Field

1) The image detectors and the spectrometer respectively acquire flame radiation images and spectra inside the furnace synchronously.

2) A ratio $\varepsilon_{\lambda_G}/\varepsilon_{\lambda_R}$ of emissivities of a flame at wavelengths of $\lambda_G$ and $\lambda_R$ is calculated according to analysis on the flame radiation spectra.

3) According to the size of the furnace, a cross-section of the furnace is divided into m space medium units and n wall units; if a furnace wall is a gray emission, absorption and diffuse reflection surface, the emissivity of the furnace wall is $\varepsilon$, and it is assumed that $\varepsilon=0.9$.

Since a biquadrate relation is formed between the radiation intensity and the temperature, and the furnace wall is covered with a water-cooled wall, the temperature of the wall is obviously lower than the flame temperature, so the radiation of the furnace wall is not considered, and only the flame radiation reflected by the furnace wall is considered.

4) A flame monochromatic radiation intensity received by each pixel unit of the image detector may be expressed by Equation (1):

$$I_\lambda(O,s) = \int_0^{l_w}\left[\frac{1}{\pi}e^{-\int_l \beta(l')dl'}\kappa_\lambda(l)n^2\right]I_{b\lambda}(T,v)dl + \qquad (1)$$

$$\int_S\left[\int_0^{l_w}\frac{1}{\pi}e^{-\int_l \beta(l')dl'}\kappa_\lambda(v)n^2 R_d^s(v,l,s)dl + \right.$$

$$\left.\frac{4}{\pi}e^{-\int_{l_w}\beta(l')dl'}\kappa_\lambda(v)n^2 R_d^s(v,w,s)\right]I_{b\lambda}(T,v)ds$$

where, l and l' represent paths of radiation transmission of the space medium units, $I_w$ represents a path of radiation transmission of the wall unit, and w represents the wall unit; v and v' represent the space medium units; s represents a whole space medium area; $\sigma$ is a Stefan-Boltzmann constant, $5.67 \times 10^{-8}$, W/(m$^2$·K$^4$); a parameter in the shape of $Rd^s$ (a, b, s) is called DRESOR number and represents a product of $4\pi$ and the share of energy emitted from a volume element centred on point a scattered by a unit volume centred on point b within a unit solid angle with s as a center line; k and n are a medium absorption coefficient and a refractive index; $\beta=\sigma+\kappa$ is an attenuation coefficient, and $\sigma$ is a medium scattering coefficient; $\varepsilon$ is a wall emissivity; and $I_{b\lambda}$ is a monochromatic blackbody radiation intensity, W/m$^3$·sr. According to the Planck's Blackbody radiation law:

$$I_{b\lambda}(T) = \frac{1}{\pi}\frac{C_1}{\lambda^5}\exp\left(-\frac{C_2}{\lambda T}\right) \qquad (2)$$

Equation (1) is discretized to obtain:

$$I_\lambda(i) = \sum_{j=1}^m R_{d,gI_\lambda}(j \to i)4\kappa_j \frac{1}{\pi}\frac{C_1}{\lambda^5}\exp\left(-\frac{C_2}{\lambda T_{g,j}}\right)\Delta S_{g,j} \qquad (3)$$

$$= \sum_{j=1}^m A_{I_\lambda}(i,j)I_{b\lambda}(j), i=1,\ldots,p$$

where, $R_{d,gI}(j \to i)$ represents the share of radiation from each unit in the furnace to each pixel unit of the image detector; $T_{g,j}$ is the temperature of the space medium unit; $\Delta S_{g,j}$ is a space medium area element; and $A_{I_\lambda}(i,j)=R_{d,gI_\lambda}(j \to i)4\kappa_j$ is a radiation intensity imaging coefficient; and for a R channel of the image detector, Equation (3) is matrixed to obtain:

$$I_{\lambda_R} = A_{I_{\lambda_R}}(\kappa_{\lambda_R}, \sigma_{\lambda_R})I_{b\lambda_R}(T) \qquad (4)$$

5) In the process of calculation, it is first assumed that the absorption coefficient and the scattering coefficient $\kappa_{\lambda_R}$ and $\sigma_{v_R}$ of the R channel at the corresponding wavelength $\lambda_R$ are uniformly distributed. In this case, a coefficient matrix $$A_{I_{\lambda_R}}$$

is a known parameter, and a monochromatic blackbody radiation intensity distribution $I_{b\lambda_R}(T)$ can be calculated by using the regularization algorithm. The base principle is to find one $I_{b\lambda_R}(T)$ to minimize the following Equation:

$$R(I_{\lambda_R},\alpha) = \left\|I_{\lambda_R} - A_{I_{\lambda_R}}(\kappa_{\lambda_R},\sigma_{\lambda_R})I_{b\lambda_R}(T)\right\|^2 + \alpha\left\|DI_{b\lambda_R}(T)\right\|^2 \qquad (5)$$

where a is a regularization parameter, and D is a regularization matrix. When Equation (5) is minimized, a solution of Equation (4) is:

$$I_{b\lambda_R}(T) = \left(A_{I_{\lambda_R}}^T(\kappa_{\lambda_R},\sigma_{\lambda_R})A_{I_{\lambda_R}}(\kappa_{\lambda_R},\sigma_{\lambda_R})+\alpha D^T D\right)^{-1}A_{I_{\lambda_R}}^T(\kappa_{\lambda_R},\sigma_{\lambda_R})I_{\lambda_R} \qquad (6)$$

$$= B_{I_{\lambda_R}}(\kappa_{\lambda_R},\sigma_{\lambda_R})I_{\lambda_R}$$

where $$B_{I_{\lambda_R}}$$

is a cross-section temperature field reconstruction matrix of the R channel.

For a G channel, the solution of Equation (4) can be written as:

$$I_{b\lambda_G}(T) = B_{I_{\lambda_G}}(\kappa_{\lambda_G},\sigma_{\lambda_G})I_{\lambda_G} \qquad (7)$$

$$= B_{I_{\lambda_R}}(\kappa_{\lambda_R},\sigma_{\lambda_R})\cdot\frac{\varepsilon_{\lambda_G}}{\varepsilon_{\lambda_R}}\cdot I_{\lambda_G}$$

where $$B_{I_{\lambda_G}}$$

is a cross-section temperature field reconstruction matrix of the G channel, and $\varepsilon_{\lambda_G}/\varepsilon_{\lambda_R}$ is an emissivity ratio obtained by spectrum analysis.

6) The temperatures in Equations (6) and (7) can be calculated by the following Equation:

$$T = -\frac{C_2}{\lambda} \Big/ \ln\left(\frac{I_{b\lambda}\lambda^5}{C_1}\right) \qquad (8)$$

in the process of calculation, the absorption coefficient and the scattering coefficient $\kappa_{\lambda_R}$ and $\sigma_{\lambda_R}$ are updated by using the Newton iteration algorithm, temperature distributions reconstructed by the radiation intensities $I_{\lambda_R}$ and $I_{\lambda_G}$ acquired by the image detector in the R and G channels are calculated respectively, and the two temperature distributions after being averaged are substituted into Equation (5) until the residual is minimized, so as to obtain a temperature field under an assumption of uniform $\kappa_{\lambda_R}$ and $\sigma_{\lambda_R}$.

7) $\sigma_{\lambda_R}$ is a known parameter, and Equation (4) can be amended to:

$$I_{\lambda_R} = A'_{I_{\lambda_R}}(\sigma_{\lambda_R})\kappa_{\lambda_R} I_{b\lambda_R}(T) \qquad (9)$$

where, $$A'_{I_{\lambda_R}}$$

is a new coefficient matrix that does not contain $\kappa_{\lambda_R} \cdot \kappa_{\lambda_R} I_{b\lambda}$ (T) is calculated by using the regularization algorithm, and then the temperature distribution T calculated by Equation (8) is substituted into $\kappa_{\lambda_R} I_{b\lambda}(T)$ so as to obtain a distribution of the absorption coefficient $\kappa_{\lambda_R}$.

Figure 2:
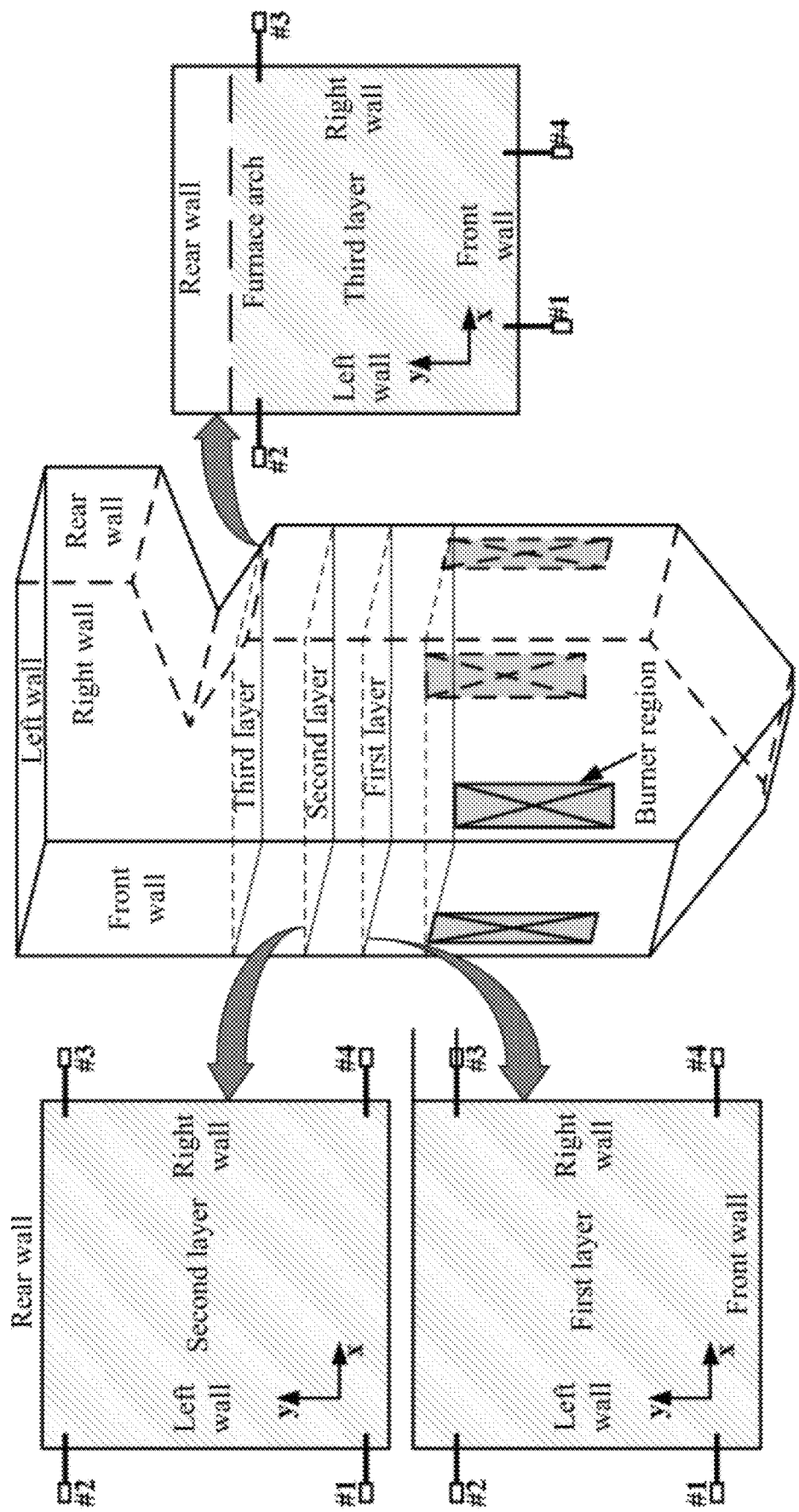
FIG. 2 is a schematic diagram of a field detection experiment.

4. Implementation of Real-Time Visual Monitoring for Cross-Section Temperature Fields and Radiation Characteristics of Boiler Furnaces by Combining Radiation Images and Spectra in a Boil Site In this embodiment, the real-time visual monitoring of cross-section temperature distribution and radiation characteristics of boiler furnaces by combining radiation images and spectra is performed at three heights above a burner layer of a 600 MW tangentially fired boiler in a coal-fired power plant somewhere, and a field detection experiment is schematically shown in FIG. 2. FIG. 2 shows the furnace size of each layer and the positions of the four image detectors, shaded areas indicate actual cross-section of the furnace, and the fiber optic spectrometer is bundled together with the image detector #1.

Figure 3:
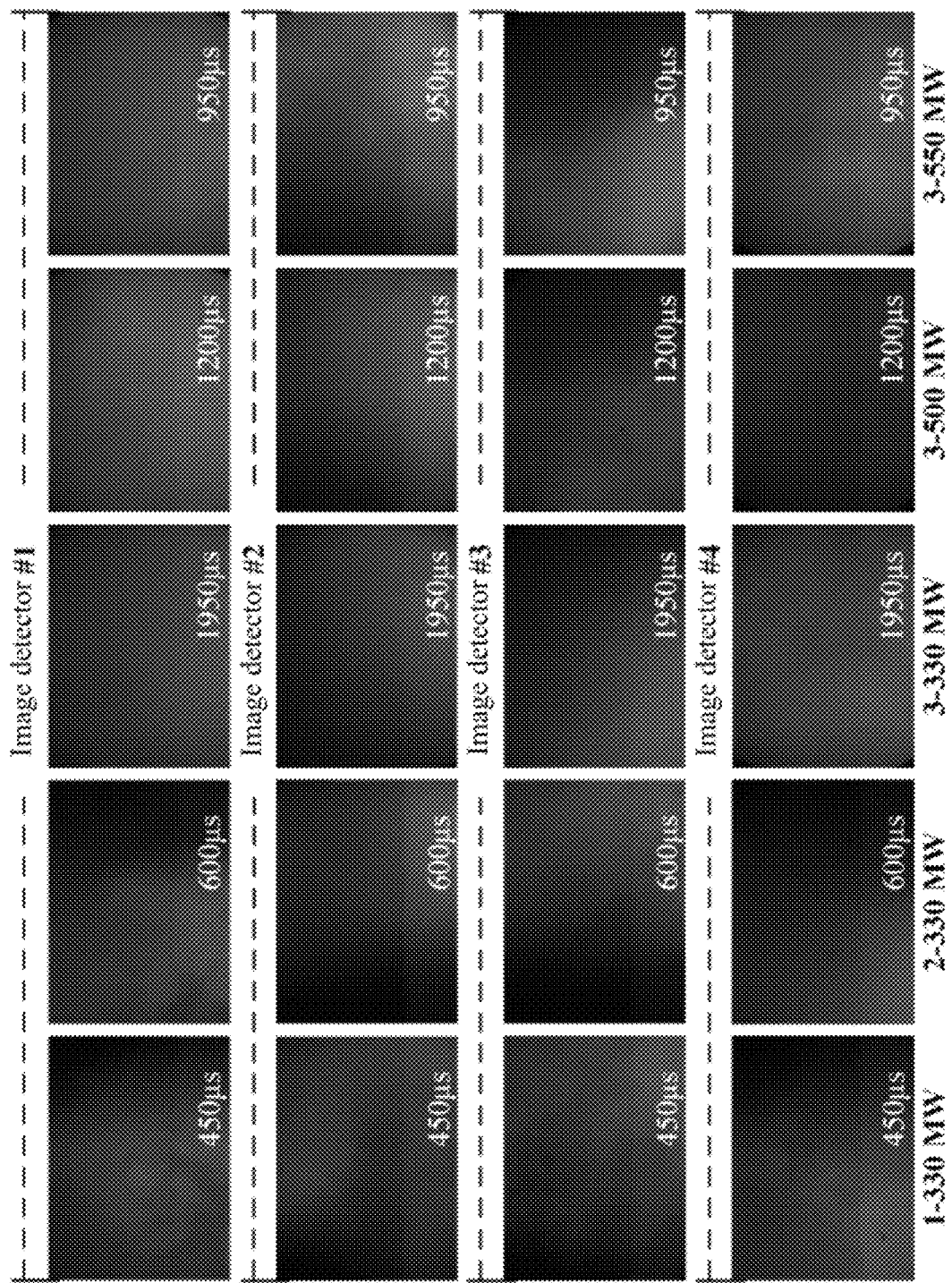
FIG. 3 shows a typical flame radiation image acquired by an image detector.

Typical flame radiation images acquired by the image detectors under five operating conditions (330 MW at the first layer, 330 MW at the second layer, and 330 MW, 500 MW and 550 MW at the third layer) are shown in FIG. 3, where exposure time is marked. It can be seen that when a load is 330 MW, there is no significant difference in the brightness of flame images acquired by the same image detector at the 1st to 3rd layers, but the exposure time decreases with the decrease of the height of the detection layer. This is due to that the detection layer at a lower position is closer to a burner region, and the flame radiation is stronger. In order to avoid image saturation, acquisition software of the image detectors moderately reduces the exposure time of an acquired image, so that the flame image has a high signal-to-noise ratio while it is unsaturated. In the third layer of field detection, with the increase of the boiler load, the exposure time of flame image acquisition also decreases. After the image detectors are subjected to blackbody furnace radiation calibration, acquired flame images can be converted into radiation intensity images.

Figure 4:
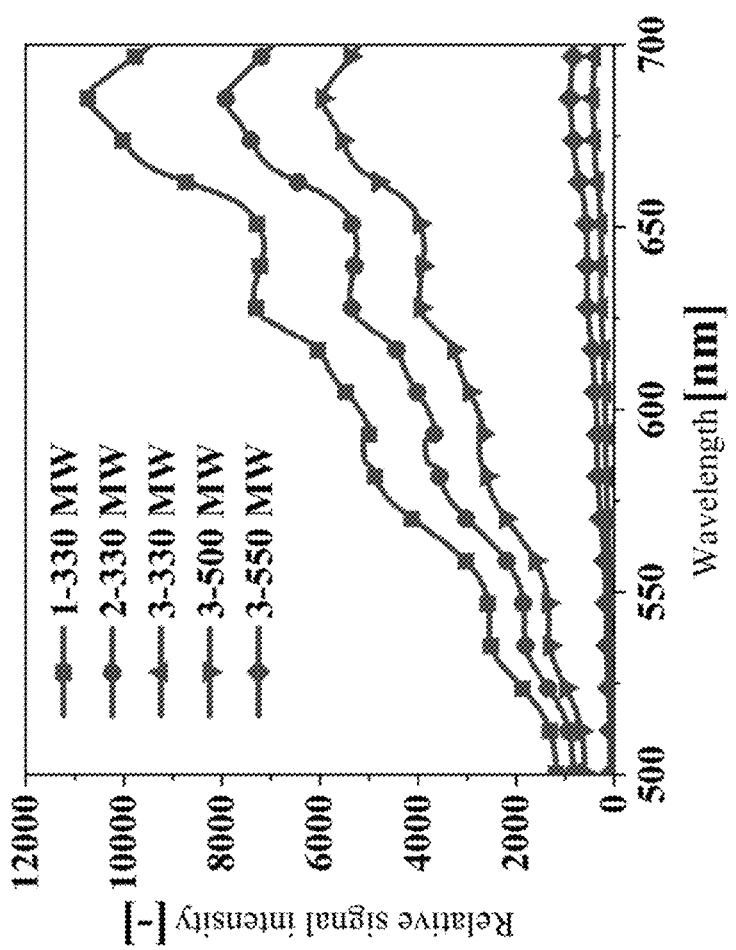
FIG. 4 shows a flame radiation spectrum acquired by a fiber optic spectrometer.

The flame radiation spectrum acquired by the fiber optic spectrometer is shown in FIG. 4. The emissivity ratios obtained by spectrum analysis under five operating conditions are 0.9153 (1-330 MW), 0.9341 (2-330 MW), 0.8801 (3-330 MW), 0.8845 (3-500 MW) and 0.9032 (3-550 MW) respectively.

Figure 5:
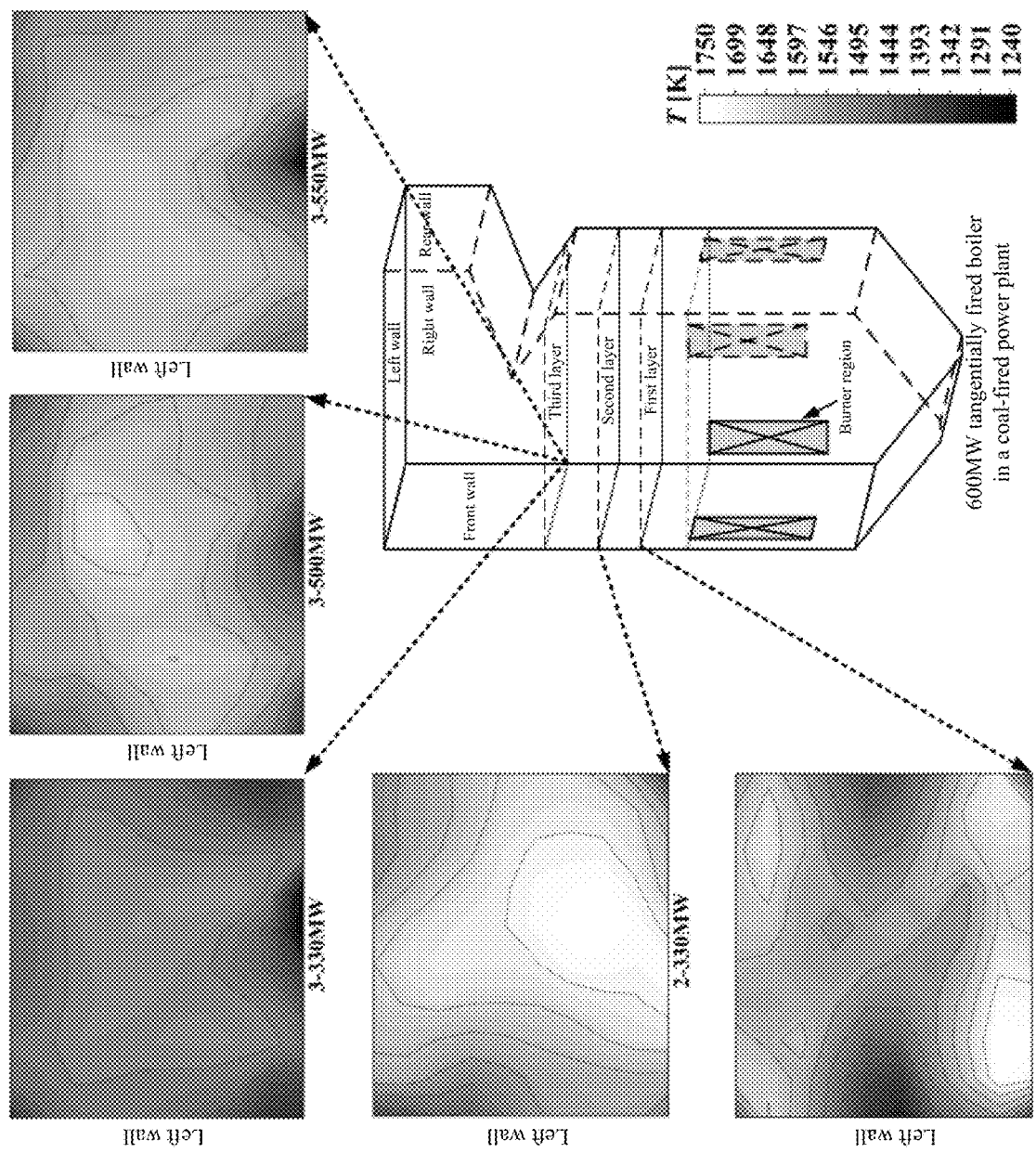
FIG. 5 shows a detection result of a furnace cross-section temperature distribution.
Figure 6:
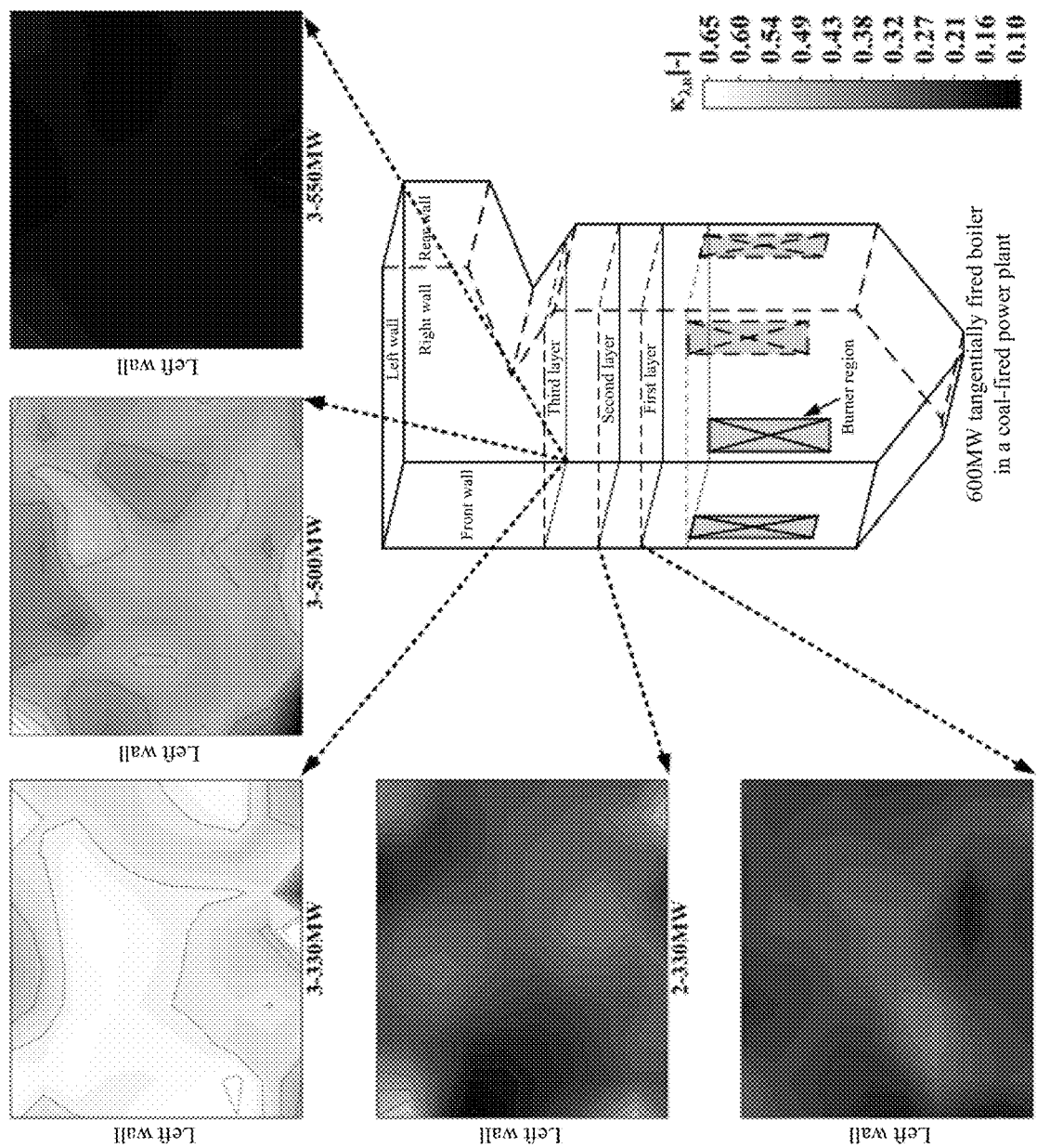
FIG. 6 shows a detection result of a furnace cross-section absorption coefficient distribution.
Figure 7:
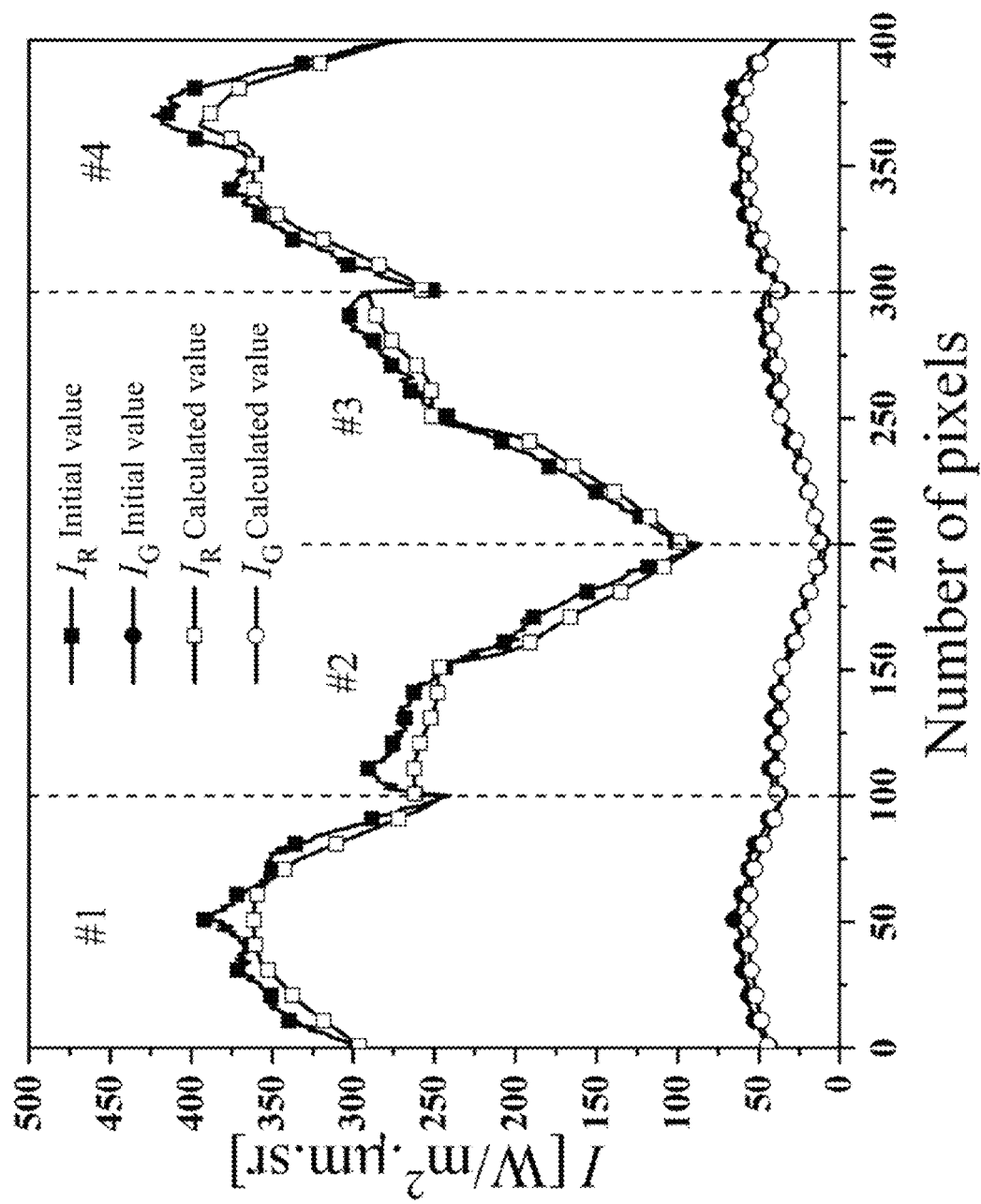
FIG. 7 is a comparison diagram of a calculated value and an initial value of a boundary radiation intensity.

A flame radiation intensity corresponding to a horizontal position in each typical flame image in FIG. 3, after being interpolated by pixels from right to left to 100 pixel units, is used for reconstruction calculation so as to obtain cross-section temperature field and absorption coefficient distributions inside the furnace under four operating conditions as shown in FIGS. 5 and 6, and a cross-section grid resolution is 10×10. In FIG. 7, with an operating condition 3-330 MW as an example, a comparison between a calculated value and an initial value of a boundary radiation intensity is given according to the pixel units after interpolation (4 image detectors×100 pixel units). It can be seen that the reconstructed boundary radiation intensity is relatively smooth in comparison with an initial radiation intensity, but the two are basically consistent, which indicates that the reconstructed results of the cross-section temperature field and the space medium radiation parameters are very reliable.

What is claimed is:

1. A visual monitoring method for cross-section temperature fields and radiation characteristics of boiler furnaces by combining radiation images and spectra, comprising:
    synchronously acquiring flame radiation images and spectra in a furnace respectively by image detectors and a spectrometer;
    correcting a temperature of a flame image according to an emissivity ratio obtained by an analysis on flame radiation spectra, and according to a reconstruction algorithm based on a radiation intensity imaging model; and
    reconstructing simultaneously a temperature distribution and an absorption coefficient distribution in the furnace.

2. The visual monitoring method for cross-section temperature fields and radiation characteristics of boiler furnaces by combining radiation images and spectra according to claim 1, wherein a dual-narrow-band pass color filter is installed in front of the image detectors, two central wavelengths $\lambda_G$ and $\lambda_R$ of the dual-narrow-band pass color filter correspond to peaks of spectral response curves of G and R channels of an industrial camera respectively, a half-band width is less than 20 nm, and the emissivity ratio is a ratio $\varepsilon_{\lambda_G}/\varepsilon_{\lambda_R}$ of emissivities of a flame at central wavelengths of $\lambda_G$ and $\lambda_R$.

3. The visual monitoring method for cross-section temperature fields and radiation characteristics of boiler furnaces by combining radiation images and spectra according to claim 1, wherein the reconstruction algorithm based on the radiation intensity imaging model comprises the following steps:
    1) dividing a cross-section of the furnace into m space medium units and n wall units;
    2) constructing the radiation intensity imaging model;
    3) reconstructing a monochromatic blackbody radiation intensity distribution by using a regularization algorithm, and in a process of calculation, introducing the emissivity ratio obtained by a spectrum analysis to correct a cross-section temperature field reconstruction matrix;

4) updating an absorption coefficient and a scattering coefficient by using a Newton iteration algorithm, and calculating a temperature distribution when a residual is extremely small; and 5) calculating an absorption coefficient distribution by taking the scattering coefficient as a known parameter.

4. The visual monitoring method for cross-section temperature fields and radiation characteristics of boiler furnaces by combining radiation images and spectra according to claim 1, wherein there are four image detectors disposed at observation holes on a same layer of the furnace, the four image detectors are perpendicular to an external façade of the furnace and penetrates an inner side of a water-cooled wall, and the four image detectors communicate with a computer equipped with a control software.

5. The visual monitoring method for cross-section temperature fields and radiation characteristics of boiler furnaces by combining radiation images and spectra according to claim 1, wherein the spectrometer is bundled together with any one of the image detectors, and communicates with a computer through a data line, and a collimating lens is disposed at a front end of an optical fiber of the spectrometer, and the collimating lens is perpendicular to an external façade of the furnace.

* * * * *